(12) United States Patent
Kirkpatrick et al.

(10) Patent No.: US 7,451,404 B1
(45) Date of Patent: Nov. 11, 2008

(54) METHODS AND SYSTEMS FOR OBTAINING DATA FROM LEGACY COMPUTER SYSTEMS

(75) Inventors: Mark A. Kirkpatrick, Conyers, GA (US); John A. Strohmeyer, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 600 days.

(21) Appl. No.: 09/921,658

(22) Filed: Aug. 6, 2001

(51) Int. Cl.
*G06F 17/00* (2006.01)
*G06F 15/00* (2006.01)

(52) U.S. Cl. .................. 715/780; 715/508; 715/517

(58) Field of Classification Search ............ 345/744, 345/854, 778, 780, 806; 715/513, 806, 746, 715/762, 764, 765, 780, 827, 866, 744, 854, 715/778, 504, 506, 508, 517, 526; 709/231, 709/310; 717/109; 707/104.1, 2–4; 705/35
See application file for complete search history.

(56) References Cited

U.S. PATENT DOCUMENTS

| | | | | |
|---|---|---|---|---|
| 5,235,654 A | * | 8/1993 | Anderson et al. | ............ 382/180 |
| 5,530,961 A | * | 6/1996 | Janay et al. | ................. 345/744 |
| 5,692,140 A | * | 11/1997 | Schmitt et al. | ............. 715/856 |
| 5,912,669 A | * | 6/1999 | Hsia | ............................ 345/854 |
| 5,914,713 A | * | 6/1999 | Nario et al. | ................... 345/744 |
| 5,974,135 A | * | 10/1999 | Breneman et al. | ....... 379/265.04 |
| 5,995,729 A | * | 11/1999 | Hirosawa et al. | ................ 703/1 |
| 6,061,516 A | * | 5/2000 | Yoshikawa et al. | .......... 717/109 |
| 6,104,798 A | * | 8/2000 | Lickiss et al. | .......... 379/201.12 |
| 6,182,276 B1 | * | 1/2001 | Brawn et al. | ................. 717/109 |
| 6,240,417 B1 | * | 5/2001 | Eastwick et al. | .............. 707/10 |
| 6,253,244 B1 | * | 6/2001 | Moore et al. | ................. 709/231 |
| 6,757,869 B1 | * | 6/2004 | Li et al. | ....................... 715/513 |
| 6,836,780 B1 | * | 12/2004 | Opitz et al. | .............. 707/104.1 |
| 2003/0195993 A1 | * | 10/2003 | Moore et al. | ................ 709/310 |
| 2004/0075692 A1 | * | 4/2004 | Matichuk | ..................... 345/806 |

FOREIGN PATENT DOCUMENTS

EP 1051007 A2 * 11/2000
WO WO 01/16720 * 3/2001

OTHER PUBLICATIONS

Rob Crigler, "Web-Enabling Legacy Systems Through Screen Mapping", Dec. 1999 Technical Enterprises, Inc.*
IBM Technical Disclosure Bulletin, "Scrren Design Facility," Jul. 1977.*
IBM Technical Disclosure Bulletin, "A Proxy-Based Tool to Enable Remote Tracing ("Software Sniffing"), Flow Capture and Replay, and Testing Via Host Interaction . . . ," Jan. 2000.*

* cited by examiner

*Primary Examiner*—Tadesse Hailu
(74) *Attorney, Agent, or Firm*—Withers & Keys, LLC

(57) ABSTRACT

Embodiments of the present invention relate to methods and systems of accessing data via a legacy computer system. A screen field configuration file for a legacy computer system is accessed, where the screen field configuration file storing screen field information. One or more screen fields are identified. Each identified screen field has a screen field identifier and one or more screen field location identifiers stored in the configuration file. One or more screen field objects are created, where each screen field object corresponds to an identified screen field.

16 Claims, 5 Drawing Sheets

| 300 | 305 | 310 | 315 | 320 | 325 | 330 |
|---|---|---|---|---|---|---|
| SCREEN NAME | FIELD NAME | SCREEN NUMBER | FIELD ROW | FIELD COLUMN | FIELD LENGTH | |
| . . . | . . . | . . . | . . . | . . . | . . . |
| OSSTR | STR1 | 1 | 5 | 11 | 18 |
| OSSTR | INT1 | 1 | 10 | 11 | 3 |
| OSSTR | BOOL1 | 1 | 10 | 21 | 1 |
| . . . | . . . | . . . | . . . | . . . | . . . |
| . . . | . . . | . . . | . . . | . . . | . . . |
| . . . | . . . | . . . | . . . | . . . | . . . |

| 300 | 305 | 310 | 315 | 320 | 325 | 330 |
|---|---|---|---|---|---|---|
| | SCREEN NAME | FIELD NAME | SCREEN NUMBER | FIELD ROW | FIELD COLUMN | FIELD LENGTH |
| | ... | ... | ... | ... | ... | ... |
| | OSSTR | STR1 | 1 | 5 | 11 | 18 |
| | OSSTR | INT1 | 1 | 10 | 11 | 3 |
| | OSSTR | BOOL1 | 1 | 10 | 21 | 1 |
| | ... | ... | ... | ... | ... | ... |
| | ... | ... | ... | ... | ... | ... |
| | ... | ... | ... | ... | ... | ... |

FIG. 3

| 400 | 405 | 410 | 415 | 420 | 425 | 430 |
|---|---|---|---|---|---|---|
| | SCREEN NAME | FIELD NAME | SCREEN NUMBER | FIELD ROW | FIELD COLUMN | FIELD LENGTH |
| | ... | ... | ... | ... | ... | ... |
| | OSSTR | STR1 | 1 | 13 | 5 | 18 |
| | OSSTR | INT1 | 1 | 15 | 5 | 3 |
| | OSSTR | BOOL1 | 1 | 15 | 14 | 1 |
| | ... | ... | ... | ... | ... | ... |
| | ... | ... | ... | ... | ... | ... |
| | ... | ... | ... | ... | ... | ... |

FIG. 4

METHODS AND SYSTEMS FOR OBTAINING DATA FROM LEGACY COMPUTER SYSTEMS

BACKGROUND OF INVENTION

1. Field of Invention

Embodiments of the present invention relate to data processing systems. More particularly, embodiments of the present invention relate to methods and systems for obtaining data from legacy computer systems.

2. Background Information

Known data processing systems can include legacy computer systems that provide data through, for example, 3270 terminals. 3270 terminals are a class of terminals often used in the System Network Architecture ("SNA") networks. SNA is a product of International Business Machines Corporation ("IBM"), headquartered in Armonk, N.Y. SNA is a structured architecture typically having a mainframe host computer acting as the network control center. The domain of an SNA network includes the host computer, front-end processors, cluster controllers, and terminals.

A 3270 terminal typically supports a display format defined by lines (i.e., rows) and columns. Examples of 3270 terminal display formats include 24 rows by 80 columns, 32 rows by 80 columns, 48 rows by 80 columns, 27 rows by 132 columns, and 25 rows by 160 columns. A 3270 terminal is an example of a dumb terminal because the 3270 terminal lacks substantial processing capabilities and is typically used for simple data entry and data retrieval tasks.

Known applications that send data to, and receive data from, legacy computer systems having 3270 terminals and the like typically identify data by, among other things, a display screen and a screen field having a position on the display screen. For example, a display screen may have a screen name, and a screen field having a position on the display screen can be identified, for example, by a row position, a column position, and a field length. Such legacy computer systems thereby identify data by screen location identifiers such as screen identifiers and screen position identifiers.

The format of the data sent to a 3270 terminal can dictate the display of data. The format (e.g., convention) has become known as a 3270 data stream, and a concept of a virtual screen is employed to facilitate the data exchange. Concepts of screen name, field name, and field data are preserved in the 3270 data stream, and a legacy computer can use the data stream for interactive screen sessions with users and -automated sessions with computers.

External computer systems can open a connection to a legacy computer system and simulate a screen-based session. The data exchange dialogue between a client system and the legacy computer system typically are based on conventions dictated by data location on a virtual screen. For example, it can be known that a name data value is on screen 2 at line 2 at column 25. The data may have a length of 40 characters. The client system can examine the data screen at those coordinates to retrieve the data value for the name. The physical device of a 3270 terminal need not be involved in the data transfer between computer systems. A physical device of a 3270 terminal was the origin of a data exchange protocol that has evolved, and references to a 3270 terminal encompass references to a virtual 3270 terminal having a 3270 data stream or a virtual screen.

The applications that send data to, and receive data from, these legacy computer systems are typically "hard coded" such that the code of the applications specifically refers to the screen name and screen position of data fields. When the layout of a 3270 screen is modified, the code of the applications must be updated, recompiled, re-tested, and re-released because the new screen names and screen positions of the data fields must be updated due to the new screen layout. In view of the foregoing, it can be appreciated that a substantial need exists for methods and systems that can advantageously obtain data from legacy computer systems.

SUMMARY OF INVENTION

Embodiments of the present invention relate to methods and systems of accessing data from a legacy computer system. A screen field configuration file for a legacy computer system is accessed. The screen field configuration file stores screen field information. One or more screen fields are identified, such that each identified screen field has a screen field identifier and one or more screen field location identifiers stored in the configuration file. One or more screen field objects are created, such that each screen field object corresponds to an identified screen field.

According to an embodiment of the present invention, an application can utilize a screen fields configuration file to send data to and receive data from a legacy computer system that identifies data by screen field location identifiers such as screen name and screen position. The application code processes data (e.g., receives data, and/or sends data) communicated with the legacy computer system by referencing screen objects corresponding to screen fields. The configuration file stores screen field location identifiers corresponding to the screen objects. When a screen layout of the legacy computer system is changed, changes to the configuration file obviate the need to update, recompile, re-test, and re-release the application code.

BRIEF DESCRIPTION OF DRAWINGS

FIG. 3 illustrates a data structure in accordance with an embodiment of the present invention.

FIG. 4 illustrates another data structure in accordance with an embodiment of the present invention.

DETAILED DESCRIPTION

Figure 1:
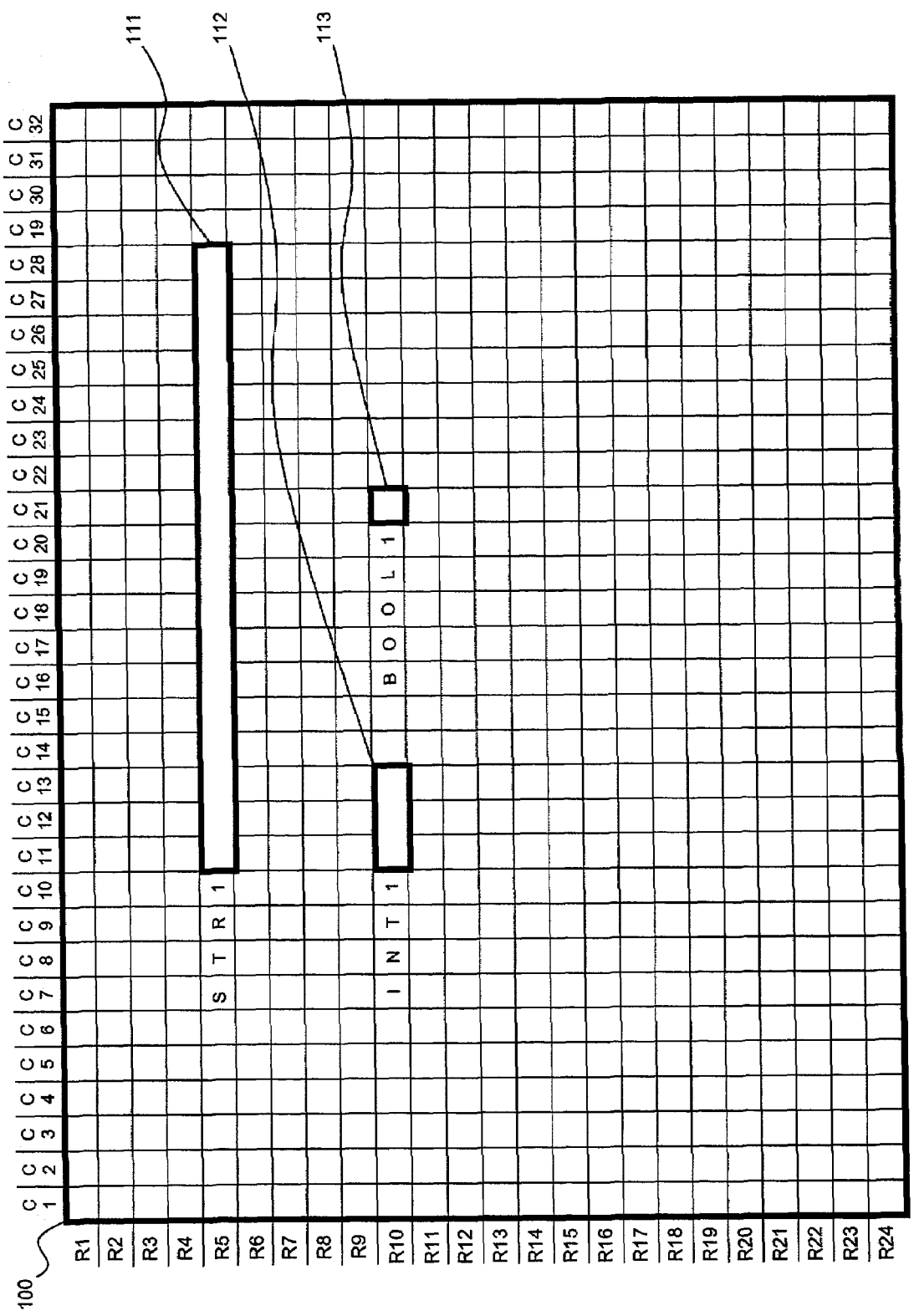
FIG. 1 is a schematic illustration of a display of screen fields on a legacy computer system terminal.

FIG. 1 is a schematic illustration of a display of screen fields on a legacy computer system terminal. Legacy computer system display 100 can be a 3270 terminal display. In another embodiment, display 100 encompasses a virtual 3270 terminal display. Display 100 can display data (i.e., a data value, at least a unit of data, and so on) within a screen field such as screen fields 111, 112, and 113. Screen field 111 can display data of a STRING1 (i.e., STR1), screen field 112 can display data of an INTEGER1 (i.e., INT1), and screen field 113 can display data of a BOOLEAN1 (i.e., BOOL1). Examples of data values include text data, numeric data, and boolean data. In another embodiment of the present invention, examples of data include video data, audio data, graphical data, multimedia data, textual data, character data, and so on.

Application programs interfacing with the terminal of display 100 typically reference screen fields 111, 112, and 113 based on, among other things, the location parameters (e.g., location identifiers) of the screen fields. For example, STR1 screen field 111 can have location parameters such as row 5, column 11, and length 18 indicating that STR1 screen field 111 displays data beginning at row 5, column 11 and having a length of 18 columns. INT1 screen field 112 can have location parameters such as row 10, column 11, and length 3 indicating that INT1 screen field 112 displays data beginning at row 10, column 11 and having a length of 3 columns. BOOL1 screen field 113 can have location parameters such as row 10, column 21, and length 1 indicating that BOOL1 screen field 113 displays data beginning at row 10, column 21 and having a length of 1 column. References in the code of known application programs interfacing with the terminal of display 100 to screen fields 111, 112, and 113 are typically "hard coded" in that they refer to, among other things, the location parameters of the screen fields.

Figure 2:
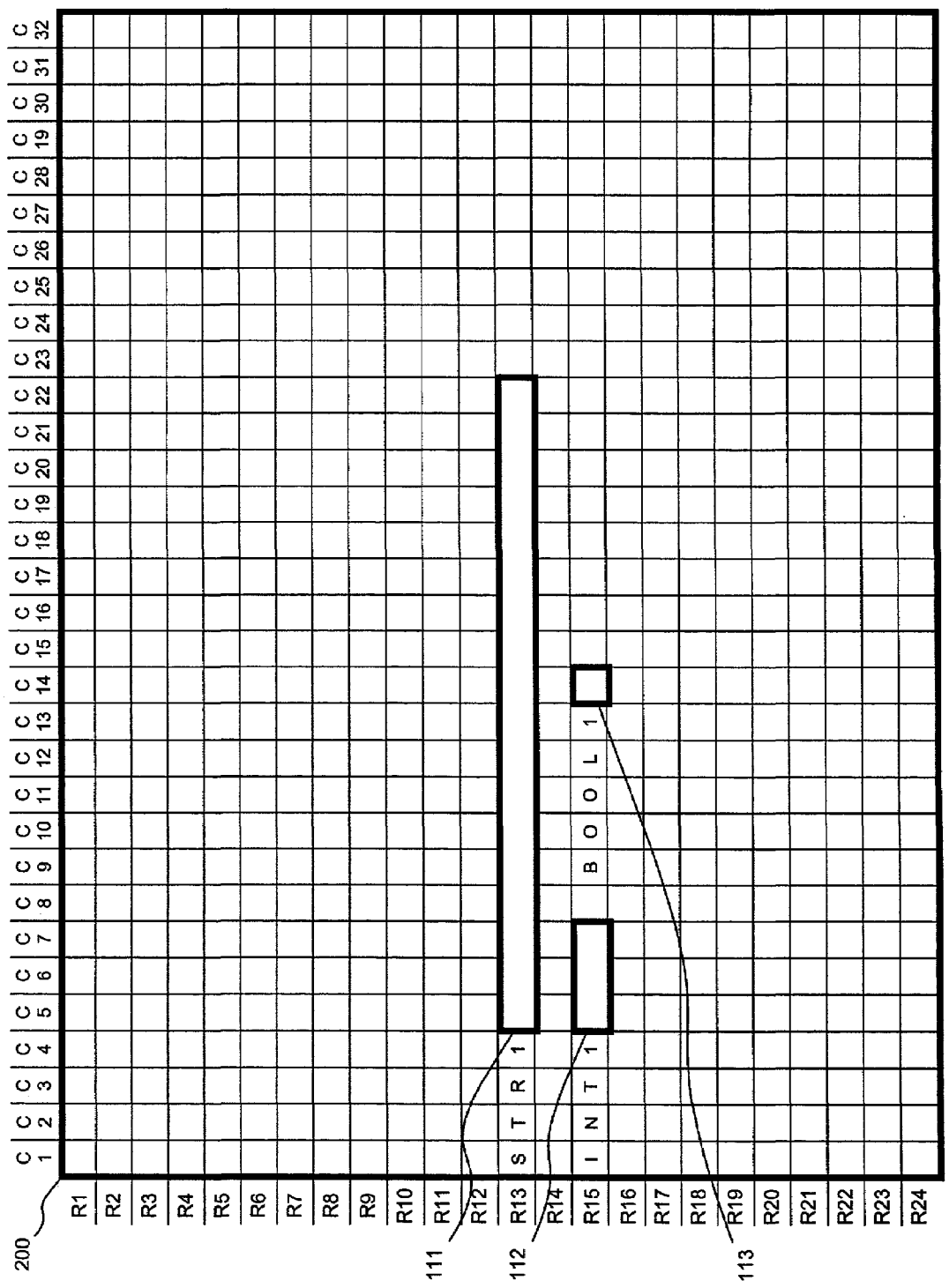
FIG. 2 is a schematic illustration of a display of screen fields on a legacy computer system terminal in which the display of screen fields is different from the display of data illustrated in FIG. 1.

FIG. 2 is a schematic illustration of a display of screen fields on a legacy computer system in which the display of data is different from the display of data illustrated in FIG. 1. Display 200 still displays data within screen fields such as screen fields 111, 112, and 113, but the location parameters of screen fields 111, 112, and 113 have changed. For example, STR1 screen field 111 can have new location parameters such as row 13, column 5, and length 18 indicating that STR1 screen field 111 now displays data beginning at row 13, column 5 and having a length of 18 columns. INT1 screen field 112 can have new location parameters such as row 15, column 5, and length 3 indicating that INT1 screen field 112 now displays data beginning at row 15, column 5 and having a length of 3 columns. BOOL1 screen field 113 can have new location parameters such as row 15, column 14, and length 1 indicating that BOOL1 screen field 113 now displays data beginning at row 15, column 14 and having a length of 1 column. For the code of known application programs interfacing with the terminal of display 200, references in the code to relocated screen fields 111, 112, and 113 that are "hard coded" typically have to be updated to refer to, among other things, the new location parameters of the relocated screen fields. Then the code typically has to be recompiled, re-tested, and re-released. Embodiments of the present invention obviate the need to update the "hard coded" references in the code and the typical requirement that the code then be recompiled and re-tested before being re-released.

In accordance with an embodiment of the present invention, a configurable method and/or system removes the need for changes in the code of applications that interface with legacy computer systems by referencing screen field location parameters when the layout of a screen changes. In an embodiment, a method or system is based at least in part on a configuration file. The configuration file stores the position of screen fields for the legacy computer system applications. The configuration file includes a data structure storing identifiers of the screen fields and the location parameters of the screen fields. For example, the screen field identifiers can include a screen name and a screen field name, and the location parameters can include a screen number, screen field row, screen field column, and screen field data length. In another embodiment, a screen field name identifies the screen field and the location parameters can include a screen identifier and screen position identifiers (e.g., X position, Y position, horizontal position, vertical position, and so on).

Application programs can access the configuration file and retrieve the screen field location parameters for data input and output purposes. For example, program variable assignments (e.g., STR1, INT1, BOOL1) can be made based on the screen field identifiers stored in the configuration file. When screen fields are repositioned, the configuration file can be updated and the application programs need not be updated.

FIG. 3 illustrates a data structure in accordance with an embodiment of the present invention. Data structure 300 can be part of a screen field configuration file that stores identifiers corresponding to application screen fields of legacy computer systems in accordance with an embodiment of the present invention. The data structure 300 can include a screen name field 305, a field name field 310, a screen number field 315, a field row field 320, a field column field 325, and a field length field 330.

For example, data structure 300 can store location parameters for the screen fields illustrated in FIG. 1. Data structure 300 can include a screen field entry corresponding to screen field STR1 111 illustrated in FIG. 1 and having a screen name OSSTR, a screen field name STR1, a screen number 1, a screen field row 5, a screen field column 11, and a screen field length 18. Data structure 300 can also include a screen field entry corresponding to screen field INT1 112 illustrated in FIG. 1 and having a screen name OSSTR, a screen field name INT1, a screen number 1, a screen field row 10, a screen field column 11, and a screen field length 3. In addition, data structure 300 can include a screen field entry corresponding to screen field BOOL1 113 illustrated in FIG. 1 and having a screen name OSSTR, a screen field name BOOL1, a screen number 1, a screen field row 10, a screen field column 21, and a screen field length 1.

FIG. 4 illustrates another data structure in accordance with an embodiment of the present invention. For example, data structure 400 can store the new location parameters for the screen fields illustrated in FIG. 2. The data structure 400 can include a screen field entry corresponding to the relocated screen field STR1 111 illustrated in FIG. 2 and having a screen name OSSTR, a screen field name STR1, a screen number 1, a screen field row 13, a screen field column 5, and a screen field length 18. Data structure 400 also can include a screen field entry corresponding to the relocated screen field INT1 112 illustrated in FIG. 2 and having a screen name OSSTR, a screen field name INT1, a screen number 1, a screen field row 15, a screen field column 5, and a screen field length 3. In addition, data structure 400 can include a screen field entry corresponding to relocated screen field BOOL1 113 illustrated in FIG. 2 and having a screen name OSSTR, a screen field name BOOL1, a screen number 1, a screen field row 15, a screen field column 14, and a screen field length 1. Thus, when screen fields are repositioned, the new location parameters of the repositioned screen fields can be stored in the configuration filed obviating the need to update, recompile, re-test, and re-release the application code.

In accordance with an embodiment of the present invention, a configuration file can be named wfascreens.cfg and store information corresponding to a screen named OSSTR that has screen fields STR1, INT1, and BOOL1. For example, wfascreens.cfg file can include the following information:

wfascreens.cfg
The value for STR1 is located on screen 1 at position X=10 Y=23. The # length is 18.
OSSTR_STR1=1:10:23:18
The value for INT1 is located on screen 1 at position X=15 Y=23. The # length is 3.
OSSTR_INT1=1:15:23:3

The value for BOOL1 is located on screen 1 at position
    X=10 Y=62. The # length is 1.
OSSTR_BOOL1=1:10:62:1

A legacy computer system application can access a screen fields configuration file to create data objects corresponding to the screen fields. An example of code that accesses the wfascreens.cfg file to create data objects corresponding to screen fields STR1, INT1, and BOOL1 can include, for example, the following code (which in this example is C++ code):

```
int main(int argc, char argv[ ]){
    try{
        // Create a ScreenScrape object that contains the file with the coordinates
        // configuration file.
        ScreenScrape coordinates;
        // Create an object to handle the data input and output with the 3270 stream.
        3270InOut 3270io;
        // Read data from the file into computer memory
        coordinates.readProperties("wfascreen.cfg", "#");
        // Create an SSLoc object called string1Loc. It contains the coordinates and
        //   length of the data to go into string1.
        SSLoc string1Loc = coordinates.ssValuewithAssert("OSSTR","STR1");
        // Load the string1 variable based on the data at the coordinates and screen
        //   in stringLoc1.
        const char *string1 = 3270io.ssValuewithAssert (string1Loc);
        // Create an SSLoc object called bool1Loc. It contains the coordinates and
        //   length of the data to go into bool1.
        SSLoc bool1Loc = coordinates.ssValuewithAssert("OSSTR", BOOL1");
        // Load the bool1 Variable based on the data at the coordinates and screen in
        //   boolLoc1. Valid values for screen data are T,F,TRUE,FALSE,1,0,Y,N
        integer bool1 = 3270io.ssBoolValueWithAssert(bool1Loc);
        // Create an SSLoc object called int1Loc. It contains the coordinates and
        //   length of the data to go into int1.
        SSLoc int1Loc = coordinates.ssValuewithAssert("OSSTR", "INT1");
        // Load the int1 variable based on the data at the coordinates and screen in
        //   intLoc1. If there is no data default to 25.
        Integer int1 = 3270io.ssIntValue(int1Loc, 25);
    }
    catch (ExceptionBase& eb) {
        cerr << db << endl;
    }
}
```

Figure 5:
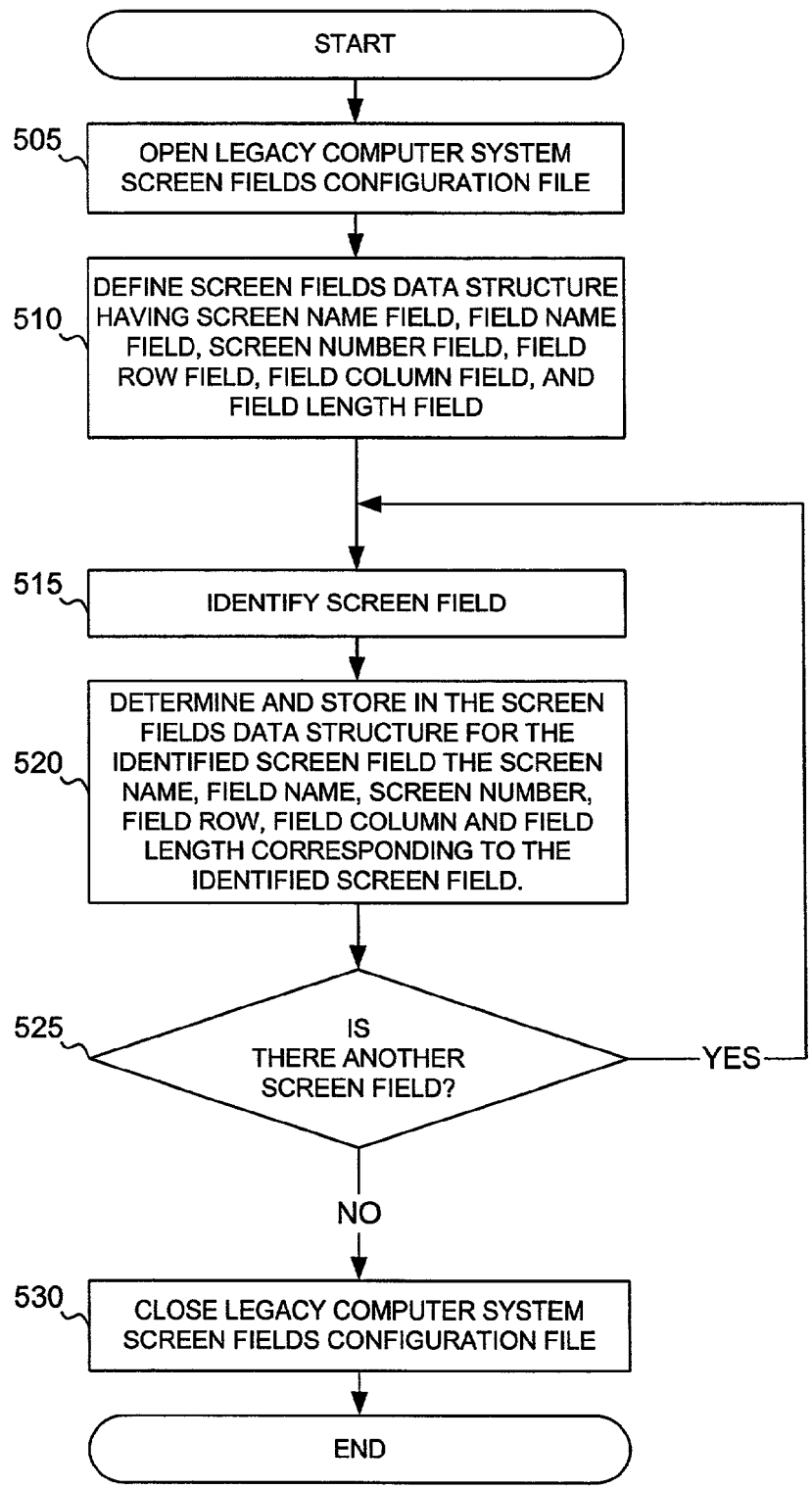
FIG. 5 is an exemplary flowchart illustrating a process in accordance with an embodiment of the present invention.

FIG. 5 is an exemplary flowchart illustrating a process in accordance with and embodiment of the present invention. In step 505, a legacy computer system screen fields configuration file can be opened, e.g., opened as part of creating the legacy computer system screen field configuration file, opened as part of updating the legacy computer system screen fields configuration file, and so on. In step 510, when the legacy computer system screen fields configuration file is opened as part of creating the legacy computer system screen fields configuration file, a screen fields data structure can be defined with two or more of a screen name field, a field name field, a screen number field, a field row field, a field column field, and a field length field. In step 515, a screen field of an application can be identified, and the screen name, field name, screen number, field row, field column, and field length corresponding to the identified screen field can be determined and stored in the screen fields data structure of the legacy computer system screen fields configuration file in step 520. Step 525 determines whether there is another screen field of the application. When there is another screen field of the application, it is identified in step 515 and the location parameters of that screen field can be determined and stored in the screen fields data structure of the legacy computer system screen fields configuration file in step 520. When there is not another screen field of the application, the legacy computer system screen fields configuration file can be closed (e.g., saved) in step 530.

Figure 6:
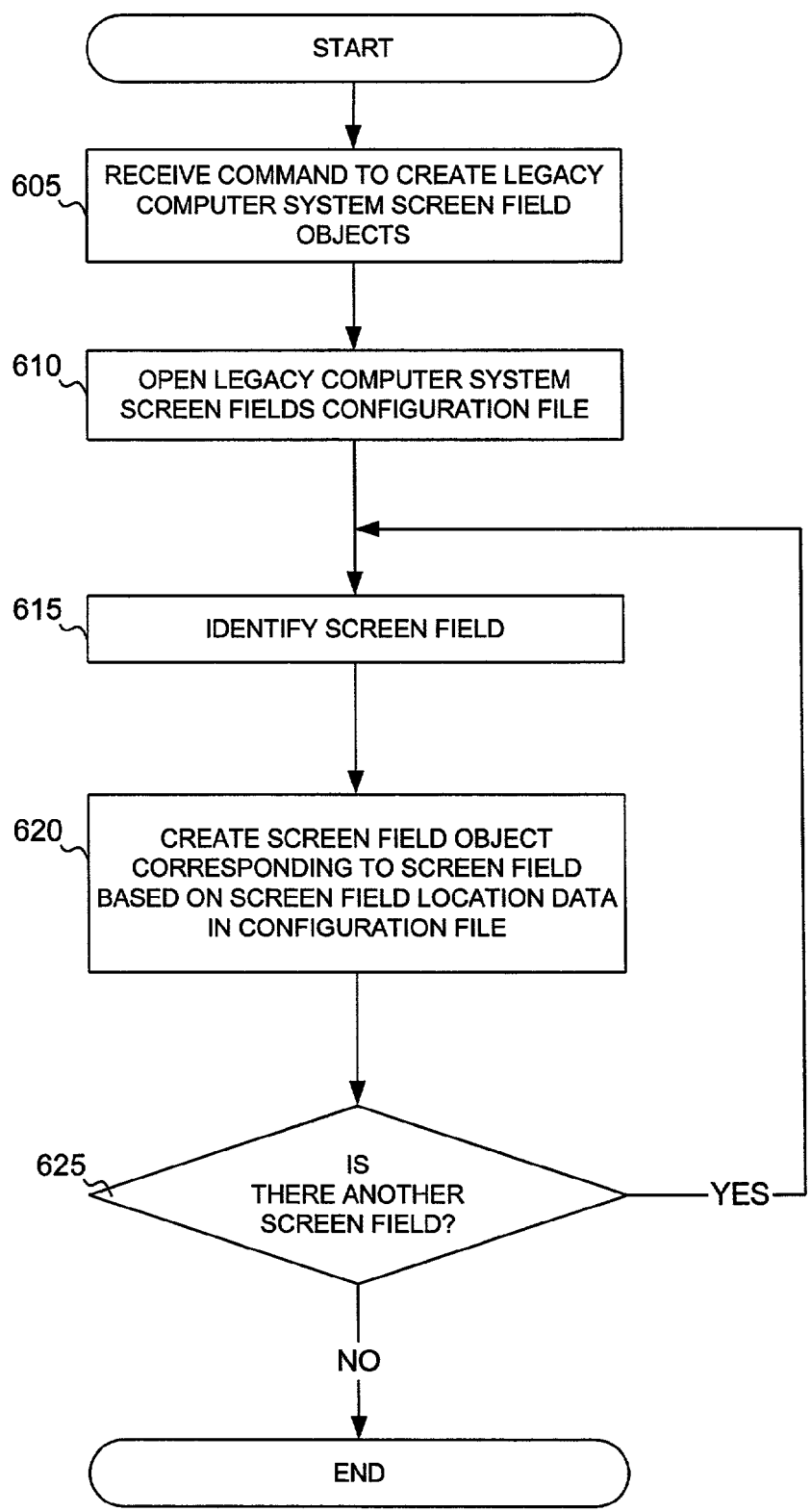
FIG. 6 is an exemplary flowchart illustrating another process in accordance with an embodiment of the present invention.

FIG. 6 is an exemplary flowchart illustrating another process in accordance with an embodiment of the present invention. In step 605, a legacy computer system application that interfaces with screen fields can receive a command to create legacy computer system screen field objects. For example, the legacy computer system application may receive that command by accessing an instruction in the application to create the legacy computer system screen field objects. The legacy computer system screen fields configuration file can be opened (e.g., accessed, read, and so on) in step 610. A screen field can be identified in step 615, and a screen field object corresponding to the screen field can be created based on the screen field location data stored in the configuration file (e.g., in a data structure of the screen field configuration file) in step 620. Whether there is another screen field to be identified is determined in step 625. When there is an additional screen field to be identified, it can be identified in step 615 and another screen field object corresponding to the additional screen field can be created based on the screen field location data stored in the configuration file (e.g., in a data structure of the screen field configuration file) in step 620. In accordance with an embodiment of the present invention, after an application has created screen field objects corresponding to screen fields, the application can access (e.g., read, write, input, output, and so on) data corresponding to the screen fields by referencing the screen field objects corresponding to the screen fields.

Embodiments of the present invention relate to communications via one or more networks. A network can include communications links such as wired communication links (e.g., coaxial cables, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In an embodiment, communications are carried by a plurality of coupled networks. As used to describe embodiments of the present invention, the term "coupled" encompasses a direct connection, an indirect connection, or a combination thereof. Moreover, two devices that are coupled can engage in direct communications, in indirect communications, or a combination thereof.

In an embodiment, a legacy computer system application is executed by a computer (e.g., a personal computer, a workstation, a network server, a network access device, and so on) that includes a processor and a memory. A processor can be, for example, an Intel Pentium® IV processor, manufactured by Intel Corporation of Santa Clara, Calif. As another example, the processor can be an Application Specific Integrated Circuit (ASIC). A server can be, for example, a UNIX server from Sun Microsystems, Inc. of Palo Alto, Calif. The memory may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, a combination thereof, and so on. The memory of the computer can store a plurality of instructions adapted to be executed by the processor.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention are described in the foregoing detailed disclosure. For purposes of explanation, numerous specific details are set forth to provide a thorough understanding of the present invention. In other instances, specific structures and devices are shown in block diagram form. It will be appreciated, however, by one skilled in the art that the present invention may be practiced without these specific details.

Further, in describing representative embodiments of the present invention, the specification may have presented a method and/or process of the present invention as a particular sequence of steps. However, to the extent that the method or process does not rely on the particular sequence of steps set forth herein, the method or process should not be limited to the particular sequence of steps described. As one of ordinary skill in the art can appreciate, other sequences of steps may be possible. Therefore, the particular order of the steps set forth in the specification should not be construed as limitations of the claims. In addition, claims directed to a method and/or process of the present invention should not be limited to performance of the steps in the recited order, and one skilled in the art can readily appreciate that the sequences may be varied and still remain within the spirit and scope of the present invention.

The foregoing detailed disclosure of the embodiments of the present invention has been presented for purposes of illustration and description. It is not intended to be exhaustive or to limit the invention to the precise disclosed embodiments. Many variations and modifications of the embodiments described herein will be appreciated by one of ordinary skill in the art in light of the above disclosure. The scope of the invention is to be defined only by the claims appended hereto, and by their equivalents.

The invention claimed is:

1. A method of accessing data via a legacy computer system, the method comprising:
   identifying a plurality of legacy computer system screen fields of an application, each screen field of the plurality of screen fields associated with at least one unit of data;
   determining for each screen field a screen field identifier and one or more screen field location identifiers;
   prior to accessing a screen containing the screen fields, storing in a configuration file the screen field identifier and the one or more screen field location identifiers for each screen field of the plurality of screen fields, wherein the one or more screen location identifiers further include a screen number, wherein the screen field location identifiers comprise a field row, a field column, and a field length, wherein each screen has a name, and wherein storing in the configuration file comprises:
   storing the screen name followed by an underscore character,
   storing the screen field identifier following the underscore character and being followed by an equal sign character,
   storing the screen number following the equal sign character and being followed by a first colon character,
   storing the field row following the first colon and being followed by a second colon,
   storing the field column following the second colon and being followed by a third colon, and
   storing the field length following the third colon; and
   obtaining the unit of data for one or more of the screen fields of the screen by finding the location of the screen fields for the screen from the screen field location identifiers of the stored configuration file.

2. The method of claim 1, the method further comprising:
   determining that a screen field location identifier for a relocated screen field has changed; determining an updated screen field location identifier for the relocated screen field; and
   storing in the configuration file the updated screen field location identifier for the relocated screen field.

3. A method of accessing data via a legacy computer system, the method comprising:
   prior to accessing a screen containing screen fields, accessing a screen field configuration file for a legacy computer system, the screen field configuration file storing screen field information comprising a screen name, a screen field identifier and screen field location identifiers comprising a screen number, a field row, a field column, and a field length, wherein the configuration file stores the screen field information in a format comprising:
   the screen name followed by an underscore character, the screen field identifier following the underscore character and being followed by an equal sign character,
the screen number following the equal sign character and being followed by a first colon character,
the field row following the first colon and being followed by a second colon,
the field column following the second colon and being followed by a third colon, and
the field length following the third colon;
identifying one or more screen fields;
creating one or more screen field objects, each screen field object corresponding to an identified screen field; and
obtaining data of a screen by referencing the one or more screen field objects to find the screen fields corresponding to the data.

4. The method of claim 3, wherein the screen field object includes screen field identifier information.

5. A system for accessing data via a legacy computer system, the system comprising:
a legacy computer system to display at least one unit of data in a screen field of a screen provided within a display of a terminal;
an application to access the at least one unit of data, the at least one unit of data associated with the screen field;
a configuration file, the configuration file to store a screen field identifier and one or more screen location identifiers associated with the screen field, wherein the configuration file is generated in advance of and prior to analysis of the screen provided within the display, wherein further the one or more screen location identifiers comprising a screen name, a screen field identifier and wherein the screen field location identifiers comprise a screen number, a field row, a field column, and a field length, wherein the configuration file stores the screen field information in a format comprising:
the screen name followed by an underscore character,
the screen field identifier following the underscore character and being followed by an equal sign character,
the screen number following the equal sign character and being followed by a first colon character,
the field row following the first colon and being followed by a second colon,
the field column following the second colon and being followed by a third colon, and
the field length following the third colon.

6. The system of claim 5, further comprising a screen field object, the screen field object corresponding to the screen field.

7. The system of claim 5, wherein the application accesses the configuration file to generate a screen field object, the screen field object corresponding to the screen field.

8. The system of claim 5, wherein the terminal is a dumb terminal.

9. The system of claim 5, wherein the terminal displays data in a plurality of screen fields.

10. The system of claim 9, wherein the terminal is a 3270-class terminal.

11. A method of accessing data via a legacy computer system, the method comprising:
a step for identifying a screen field of an application, the screen field associated with at least a unit of data contained in a screen;
a step for determining a screen field identifier and a screen field location identifier for the screen field; and
a step for storing in a configuration file prior to analyzing the screen the screen field identifier and the one or more screen field location identifiers for the screen field in association with a screen name, the screen field location identifiers comprising a screen number, a field row, a field column, and a field length, wherein the configuration file stores the screen field information in a format comprising:
the screen name followed by an underscore character,
the screen field identifier following the underscore character and being followed by an equal sign character,
the screen number following the equal sign character and being followed by a first colon character,
the field row following the first colon and being followed by a second colon,
the field column following the second colon and being followed by a third colon, and
the field length following the third colon; and
a step for obtaining the unit of data from the screen field of the screen by referencing the configuration file.

12. The method of claim 11, the method further comprising:
a step for determining that a screen field location identifier of the one or more screen field location identifiers for the screen field has changed;
a step for determining an updated screen field location identifier for the screen field; and a step for storing in the configuration file the updated screen field location identifier for the screen field.

13. A method of accessing data via a legacy computer system, the method comprising:
a step for accessing a screen field configuration file for a legacy computer system, the screen field configuration file storing screen field information, the screen fields configuration file existing in advance of a screen field containing screen fields corresponding to the screen field information and the screen field information comprising a screen name, a screen field identifier and screen field location identifiers comprising a screen number, a field row, a field column, and a field length, wherein the configuration file stores the screen field information in a format comprising:
the screen name followed by an underscore character,
the screen field identifier following the underscore character and being followed by an equal sign character,
the screen number following the equal sign character and being followed by a first colon character,
the field row following the first colon and being followed by a second colon,
the field column following the second colon and being followed by a third colon, and
the field length following the third colon;
a step for identifying one or more screen fields, each identified screen field having a screen field identifier and one or more screen field location identifiers stored in the configuration file; and
a step for creating one or more screen field objects, each screen field object corresponding to an identified screen field; and
a step for obtaining data from the screen field of the screen by referencing the screen field objects.

14. The method of claim 13, further comprising:
a step for executing an application, the application to interface with a terminal of a legacy computer system; and
a step for accessing at least a unit of data associated with the one or more screen fields by referencing the one or more screen field objects.

15. A system for accessing data via a legacy computer system, the system comprising:

means for accessing a screen field configuration file for a legacy computer system, the screen field configuration file storing screen field information, and the screen field configuration file existing in advance of a screen including screen fields where data is located and the screen field information comprising a screen name, a screen field identifier and screen field location identifiers comprising a screen number, a field row, a field column, and a field length, wherein the configuration file stores the screen field information in a format comprising:

the screen name followed by an underscore character, the screen field identifier following the underscore character and being followed by an equal sign character, the screen number following the equal sign character and being followed by a first colon character, the field row following the first colon and being followed by a second colon, the field column following the second colon and being followed by a third colon, and the field length following the third colon;

means for identifying one or more screen fields, each identified screen field having a screen field identifier and one or more screen field location identifiers stored in the configuration file;

means for creating one or more screen field objects, each screen field object corresponding to an identified screen field; and means for accessing data from the screen fields of the screen by referencing the screen field objects.

16. A computer-readable medium storing a plurality of instructions to be executed by a processor for accessing data via a legacy computer system, the plurality of instructions including instructions to:

access a screen field configuration file for a legacy computer system, the screen field configuration file storing screen field information, the screen field configuration file existing in advance of a screen having screen fields where data is located and the screen field information comprising a screen name, a screen field identifier and screen field location identifiers comprising a screen number, a field row, a field column, and a field length, wherein the configuration file stores the screen field information in a format comprising:

the screen name followed by an underscore character, the screen field identifier following the underscore character and being followed by an equal sign character, the screen number following the equal sign character and being followed by a first colon character, the field row following the first colon and being followed by a second colon, the field column following the second colon and being followed by a third colon, and the field length following the third colon;

identify one or more screen fields, each identified screen field having a screen field identifier and one or more screen field location identifiers stored in the configuration file; and create one or more screen field objects, each screen field object corresponding to an identified screen field.

* * * * *